United States Patent
Regini et al.

(10) Patent No.: US 8,695,008 B2
(45) Date of Patent: Apr. 8, 2014

(54) METHOD AND SYSTEM FOR DYNAMICALLY CONTROLLING POWER TO MULTIPLE CORES IN A MULTICORE PROCESSOR OF A PORTABLE COMPUTING DEVICE

(75) Inventors: Edoardo Regini, San Diego, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 13/080,454

(22) Filed: Apr. 5, 2011

(65) Prior Publication Data
US 2012/0260258 A1   Oct. 11, 2012

(51) Int. Cl.
*G06F 9/46* (2006.01)
*G06F 1/00* (2006.01)

(52) U.S. Cl.
USPC .......... 718/104; 718/102; 718/105; 713/322; 713/323

(58) Field of Classification Search
None
See application file for complete search history.

(56) References Cited

U.S. PATENT DOCUMENTS

| | | | |
|---|---|---|---|
| 7,062,394 B2 * | 6/2006 | Sun | 702/75 |
| 7,437,580 B2 * | 10/2008 | Henderson et al. | 713/320 |
| 7,437,581 B2 | 10/2008 | Grochowski et al. | |
| 7,770,034 B2 * | 8/2010 | Nanja | 713/300 |
| 7,865,751 B2 * | 1/2011 | Monferrer et al. | 713/322 |
| 7,886,131 B1 * | 2/2011 | Kang | 712/220 |
| 7,921,312 B1 * | 4/2011 | Pennanen et al. | 713/300 |
| 8,261,117 B2 * | 9/2012 | Duvalsaint et al. | 713/322 |
| 8,286,016 B2 * | 10/2012 | Monferrer et al. | 713/322 |
| 8,341,638 B2 * | 12/2012 | Duvalsaint et al. | 718/104 |
| 8,370,654 B1 * | 2/2013 | Hasko et al. | 713/300 |
| 8,381,004 B2 * | 2/2013 | Elnozahy et al. | 713/321 |
| 8,407,709 B2 * | 3/2013 | Inari | 718/103 |
| 8,438,404 B2 * | 5/2013 | Duvalsaint et al. | 713/300 |
| 8,595,527 B2 * | 11/2013 | Chung et al. | 713/322 |
| 2003/0036884 A1 * | 2/2003 | Orii | 702/186 |
| 2004/0015978 A1 * | 1/2004 | Orii | 718/105 |
| 2005/0034002 A1 | 2/2005 | Flautner | |

(Continued)

OTHER PUBLICATIONS

Isci et al, "An Analysis of Efficient Multi-Core Global Power Management Policies: Maximizing Performnace for a Given Power Budget", IEEE, 2006, pp. 1-12.*

(Continued)

*Primary Examiner* — Abdullah Al Kawsar
(74) *Attorney, Agent, or Firm* — Nicholas A. Cole

(57) ABSTRACT

A method and system for dynamically determining the degree of workload parallelism and to automatically adjust the number of cores (and/or processors) supporting a workload in a portable computing device are described. The method and system includes a parallelism monitor module that monitors the activity of an operating system scheduler and one or more work queues of a multicore processor and/or a plurality of central processing units ("CPUs"). The parallelism monitor may calculate a percentage of parallel work based on a current mode of operation of the multicore processor or a plurality of processors. This percentage of parallel work is then passed to a multiprocessor decision algorithm module. The multiprocessor decision algorithm module determines if the current mode of operation for the multicore processor (or plurality of processors) should be changed based on the calculated percentage of parallel work.

32 Claims, 9 Drawing Sheets

(56) References Cited

U.S. PATENT DOCUMENTS

| | | | |
|---|---|---|---|
| 2005/0132238 A1* | 6/2005 | Nanja | 713/300 |
| 2005/0251700 A1* | 11/2005 | Henderson et al. | 713/401 |
| 2006/0095807 A1* | 5/2006 | Grochowski et al. | 713/324 |
| 2006/0101464 A1* | 5/2006 | Dohrmann | 718/100 |
| 2008/0046894 A1* | 2/2008 | Bhattacharjee et al. | 718/105 |
| 2009/0049314 A1* | 2/2009 | Taha et al. | 713/300 |
| 2009/0328055 A1 | 12/2009 | Bose et al. | |
| 2010/0037038 A1 | 2/2010 | Bieswanger et al. | |
| 2010/0064154 A1 | 3/2010 | King | |
| 2010/0153763 A1 | 6/2010 | Sood | |
| 2010/0174923 A1 | 7/2010 | Houlihan et al. | |
| 2011/0022867 A1* | 1/2011 | Chang et al. | 713/323 |
| 2011/0072295 A1* | 3/2011 | Shahidi et al. | 713/340 |
| 2012/0084575 A1* | 4/2012 | Flores et al. | 713/300 |

OTHER PUBLICATIONS

Ahn et al, "Flexible Framework for Dynamic Management of Multi-Core Systems", IEEE, 2009, pp. 237-240.*

International Search Report and Written Opinion—PCT/US2012/031996, International Search Authority—European Patent Office, Jun. 8, 2012.

Seo Euiseong et al., "Energy Efficient Scheduling of Real-Time Tasks on Multicore Processors", IEEE Transactions on Parallel and Distributed Systems, IEEE Service Center, Los Alamitos, CA, US, vol. 19, No. 11, Nov. 1, 2008, pp. 1540-1552, XP011229316, ISSN: 1045-9219, DOI: 10.1109/TPDS.2008.104, the whole document.

Wonyoung Kim et al., "System Level Analysis of Fast, Per-Core DVFS using On-Chip Switching Regulators," IEEE International Symposium on High-Performance Computer Architecture (HPCA), Feb. 2008, pp. 1-12.

* cited by examiner

800

| TASK | A | B | ... | N |
|---|---|---|---|---|
| WEB BROWSING | 72 | 86 | | 25 |
| A/V PLAYBACK | 73 | 86 | | 13 |
| AUDIO PLAYBACK | 87 | 86 | | 21 |
| EMAIL APP. | 99 | 86 | | 36 |
| OTHER APP(S). | 96 | 86 | | 75 |
| IDLE | | | | |
| | $(P_1, P_2)$ | $(P_1, P_3, P_5)$ | | $(P_1, P_2)$ |

| TASK | A | B | ... | N |
|---|---|---|---|---|
| WEB BROWSING | 70 | 89 | | 54 |
| A/V PLAYBACK | 64 | 89 | | 33 |
| AUDIO PLAYBACK | 85 | 86 | | 71 |
| SMS APP. | 96 | 84 | | 53 |
| OTHER APP(S). | 91 | 78 | | 85 |
| IDLE | | | | |
| | $(P_1, P_4)$ | $(P_1, P_3, P_4)$ | | $(P_1, P_5)$ |

860

FIG. 8B

METHOD AND SYSTEM FOR DYNAMICALLY CONTROLLING POWER TO MULTIPLE CORES IN A MULTICORE PROCESSOR OF A PORTABLE COMPUTING DEVICE

DESCRIPTION OF THE RELATED ART

Portable computing devices ("PCDs") are becoming necessities for people on personal and professional levels. These devices may include cellular telephones, portable/personal digital assistants ("PDAs"), portable game consoles, portable navigation units, palmtop computers, and other portable electronic devices.

These PCDs may have multiple central processing units ("CPUs") as well as multicore CPUs to execute a variety of software application modules. Most PCDs power their CPUs symmetrically. Each PCD is also usually designed for singlethreaded software application modules without any consideration for distributing the singlethreaded workloads across multiple CPUs or a multicore CPU. With this symmetrical powering of CPUs in PCDs and individualized support for singlethreaded workloads, wasteful power consumption usually occurs for PCDs due to leakage from idle CPUs or cores not working because they are not clocked.

Opposite to singlethreaded workloads are multithreaded workloads which may require parallel processing from multiple CPUs or a multicore CPU. While it is feasible that some multithreaded workloads may be able to communicate to an operating system an ideal number of plural CPUs needed to support a particular software application module, this information may have little or no value when a PCD is required to execute multiple software application modules in which each module has its own multithread workload.

Accordingly, what is needed in the art is a method and system for controlling power to multiple cores in a multicore processor of a PCD. Particularly, there is a need in the art for a method and system that may dynamically determine the degree of workload parallelism of one or more software application modules and to automatically adjust the number of cores supporting the workload of the one or more software application modules.

SUMMARY

A method and system for dynamically determining the degree of workload parallelism and to automatically adjust the number of cores (and/or processors) supporting a workload in a portable computing device are described. The method and system includes a parallelism monitor module that receives activity data from an operating system scheduler and one or more work queues of a multicore processor and/or a plurality of central processing units ("CPUs"). The parallelism monitor may calculate a percentage of parallel work based on a current mode of operation of the multicore processor or a plurality of processors. This percentage of parallel work is then passed to a multiprocessor decision algorithm module. The multiprocessor decision algorithm module determines if the current mode of operation for the multicore processor (or plurality of processors) should be changed based on the calculated percentage of parallel work.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 8A and 8B include schematic diagrams illustrating embodiments of use cases.

DETAILED DESCRIPTION

Figure 1:
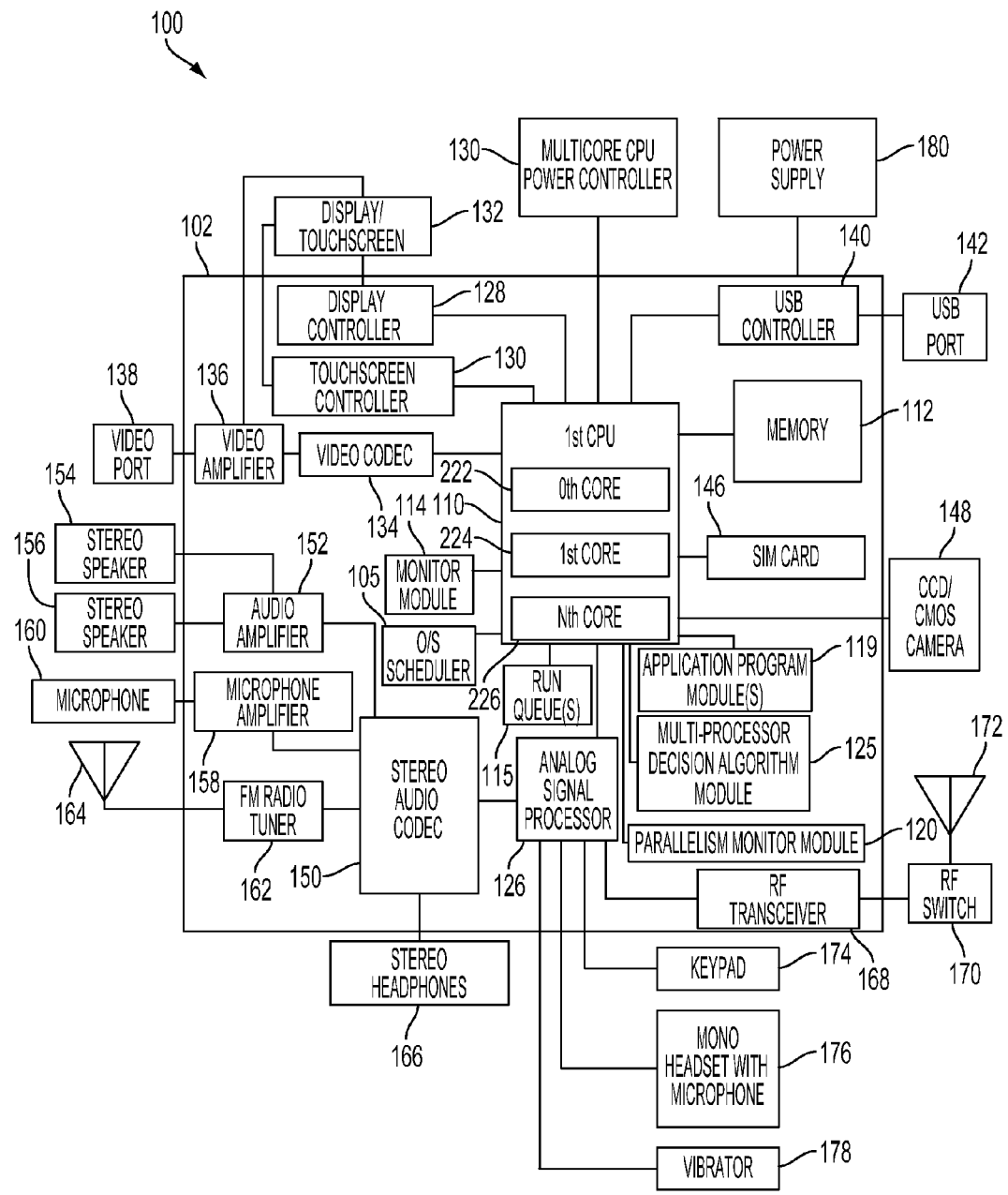
FIG. 1 is a functional block diagram illustrating an embodiment of a portable computing device (PCD) having a parallelism monitor working in combination with a multiprocessor decision algorithm module.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

Elements of PCD 100 for Dynamically Controlling Multiple CPUs 110 and/or Cores of a Multicore CPU 110:

Referring to FIG. 1, this figure is a functional block diagram of an exemplary, non-limiting aspect of a PCD 100 in the form of a wireless telephone for implementing methods and systems for dynamically controlling multiple central processing units ("CPUs") 110 and/or multicore CPUs 110. As illustrated in FIG. 1, PCD 100 may comprise a multi-core CPU 110 and an analog signal processor 126. These processors 110 and 126 may be coupled together.

The CPU 110 may comprise a zeroth core 222, a first core 224, and an Nth core 226 as understood by one of ordinary skill in the art. In an alternate embodiment, instead of using CPU 110, one or more digital signal processors ("DSPs") may also be employed as understood by one of ordinary skill in the art. The CPU 110 may be coupled to a performance monitor module 114. The performance monitor module 114 may scale the performance of the respective processor core 222, 224, 226 according to dynamic voltage and frequency scaling ("DVFS") algorithms as will be described in further detail below in connection with FIG. 7.

The PCD 100 may comprise a parallelism monitor module 120 and a multiprocessor decision algorithm module 125. One of ordinary skill in the art will recognize that each module 120 or 125 may comprise one or more software modules that may be divided into various parts and executed by different processors 110, 126 without departing from this disclosure. Alternatively, each module 120 or 125 may be organized as a single element and executed by a single processor 110 or 126 as illustrated in FIG. 1.

Each module 120 or 125 may comprise software which is executed by the CPU 110 for monitoring and controlling workflow for multiple CPUs 110 and/or cores 222, 224, 226 of a multicore CPU 110. However, each module 120 or 125 may also be formed from hardware and/or firmware as understood by one of ordinary skill in the art.

The parallelism monitor module 120 working in combination with the multiprocessor decoding algorithm module 125 may determine when messages should be sent to a CPU power controller 130 in order to power on a particular core 222, 224, 226 or processor 126. The parallelism monitor module 120 monitors the run queues 115 for parallel work and passes its observations about the parallel work to the multicore processor decoding algorithm module 125. The multicore decoding algorithm module 125 determines when one or more cores 222, 224, 226 or processor 126 should be powered on in the presence of parallel work and when one or more cores 222, 224, 226 or processor 126 should be powered off in the absence of parallel work.

The multicore CPU 110 is in communication with and/or may execute an O/S scheduler module 105, one or more run queues 115, the parallelism monitor module 120, and the multiprocessor decision algorithm module 125. The multicore CPU 110 is also coupled to the multicore CPU power controller 130 in memory 112. The multicore CPU power controller 130 may be responsible for controlling power to the cores 222, 224, and 226 of the multicore CPU 110. Memory 112 may comprise volatile and/or non-volatile storage. Memory 112 may include, but is not limited to, any type of computer readable media, such as random access memory ("RAM"), dynamic random access memory ("DRAM"), electrically erasable programmable read only memory ("EEPROM"), and the like. Memory 112 may store program modules such as the one or more application program modules 119, the O/S scheduler module 105, the parallelism monitor module 120, and the multiprocessor decision algorithm module 125 before execution when these modules are embodied as software as understood by one of ordinary skill the art.

FIG. 1: Other Elements of the PCD 100

As illustrated in FIG. 1, a display controller 128 and a touchscreen controller 130 are coupled to the CPU 110. A touchscreen display 132 external to the on-chip system 102 is coupled to the display controller 128 and the touchscreen controller 130.

FIG. 1 is a schematic diagram that illustrates a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multicore central processing unit ("CPU") 110A. A video amplifier 136 is coupled to the video encoder 134 and the touchscreen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322.

Figure 2:
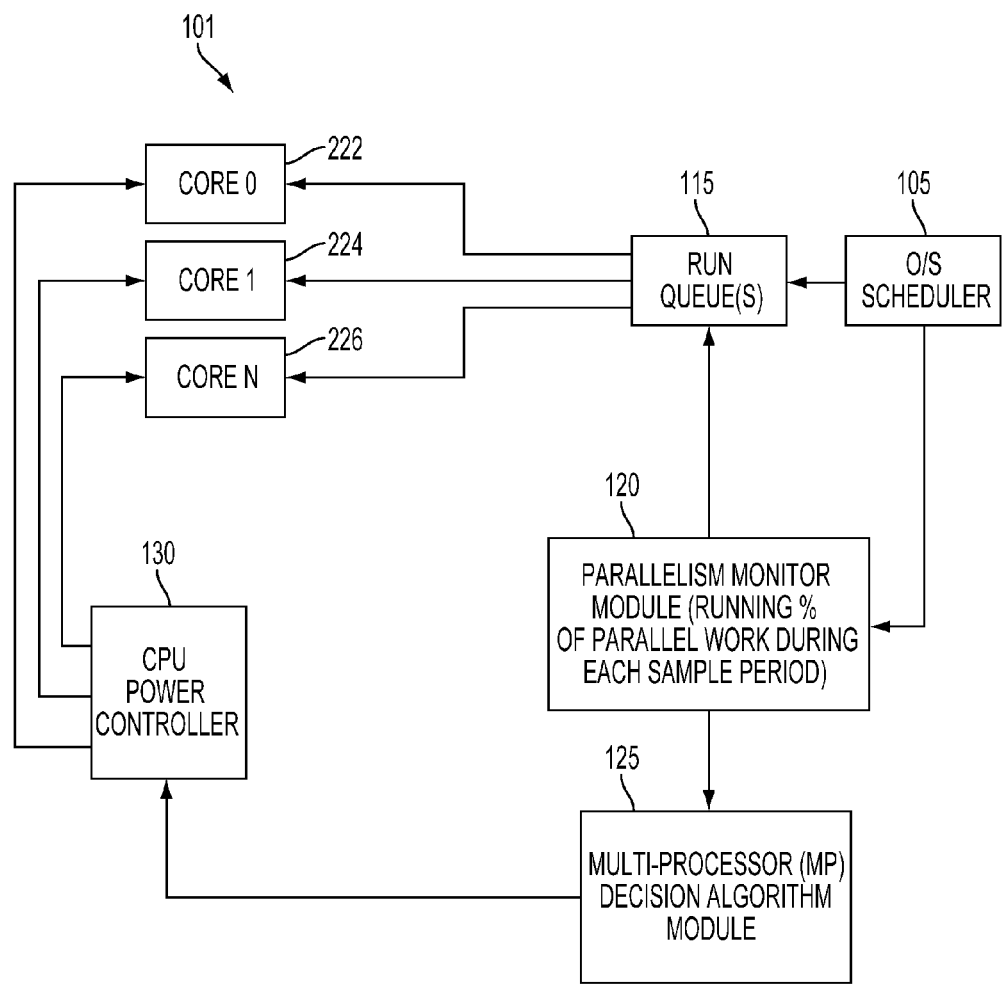
FIG. 2 is a functional block diagram illustrating a communication flow between elements of the system for dynamically controlling multiple CPUs and/or multicore CPUs.

FIG. 2 is a functional block diagram illustrating a communication flow between elements of the system 101 for dynamically controlling multiple CPUs 110 and/or multicore CPUs 110. In system 101, the O/S scheduler module 105 is coupled to one or more run queues 115 and the parallelism monitor module 120. While a single functional block is illustrated for the one or more run queues 115, one of ordinary skill in the art recognizes that separate run queues 115 may be provided for each core 222, 224, 226 of a multicore CPU 110 or for each CPU 110 of a plurality of CPUs 110 being managed by the system 101.

The one or more run queues 115 feed work tasks into each core 222, 224, 226 of the multicore CPU 110 as illustrated in FIG. 2. Alternatively, the run queues 115 may feed work tasks into each CPU 110 of a plurality of CPUs 110.

The parallelism monitor module 120 is coupled to the run queues 115, the O/S. scheduler 105, and the multiprocessor decision algorithm module 125. While the parallelism monitor module 120 is illustrated as a separate module relative to the multiprocessor decision algorithm module 125, these two modules 120, 125 may be formed into a single unitary module as understood by one of ordinary skill in the art.

The multiprocessor decision algorithm module 125 is coupled to the parallelism monitor module 120 and the CPU power controller 130. The multiprocessor decision algorithm module 125 receives data from the parallelism monitor module 120 and makes decisions based on this data. The results of the decisions made by the multiprocessor decision algorithm module 125 are transmitted as messages to the CPU power controller 130 as will be described in further detail below.

The O/S scheduler module 105 may be embodied as software. The O/S scheduler module 105 may be responsible for scheduling work tasks receive from the one or more application programs 119 executed by the multicore CPU 110 or the processor 126. The application programs 119 may include, but are not limited to, wireless phone call applications, global positioning satellite ("GPS") applications, e-mail applications, calendar applications, wordprocessing applications, spreadsheet applications, entertainment applications that support audio and/or video, etc.

Work tasks may include request from the application programs 119. For example, an application program 119 for entertainment may request the O/S scheduler module 105 to display a plurality of frames for a video on the display 132 of the PCD 100. The O/S scheduler module 105 may assign and distribute these video work tasks across the cores 222, 224, 226 of the multicore CPU 110. The O/S scheduler module 105 may assign each work task and place the work tasks having respective core assignments in the run queue 115. The run queue 115 may be embodied as software and/or hardware as understood by one of ordinary skill the art. The run queue 115 may hold assigned work tasks and/or threads until a particular CPU and/or a core of the multicore CPU 110 is ready to process the work task.

The parallelism monitor 120 is responsible for tracking the work tasks being managed by the O/S scheduler module 105. The parallelism monitor 120 is in communication with the run queue 115. The parallelism monitor module 120 may be embodied as software. Alternatively, the parallelism monitor module 120 may be embodied as a hardware as understood by one of ordinary skill the art.

The parallelism monitor module 120 determines the amount of parallel work been assigned and distributed across the multiple CPUs 110 and/or cores 222, 224, 226 of a multicore CPU 110. The parallelism monitor module 120 usually determines the amount of parallel work by sampling data taken from the run queue 115. The frequency in which the parallelism monitor module 120 samples data from the run queue 115 may be changed or modified as needed. The sampling frequency may be adjusted based on work volume.

For example, when a plurality of application programs 119 are being executed by the CPU 110, the sampling frequency may be increased since it is likely that an increased number of work tasks will be generated and placed in the run queues 115. Conversely, when the number of application programs is relatively small, such as on the order of two programs or less, then the sampling frequency of the parallelism monitor module 120 may be adjusted downward or in a decreased manner.

The parallelism monitor module 120 may receive callbacks from the O/S scheduler 105. These callbacks may occur whenever a new task is added or removed from any of the run queues 115 for the cores 222, 224, and 226. At each callback, the parallelism monitor 120 may update its local count of the tasks in the run queue 115. On a periodic basis, such as on the order of about every twenty milliseconds, the parallelism monitor module 120 may accumulate its instantaneous readings into a running percentage of work executed in parallel across the cores 222, 224, 226 during its sampling period.

The data resident in the run queues 115 sampled by the parallelism monitor module 120 may include the total number of tasks being assigned at a given instant of time by the O/S scheduler 105. The parallelism monitor module 120 uses the sample data to calculate a percentage of parallel work. This percentage of parallel work will be described in further detail below in connection with FIGS. 3A-3B. The percentage of parallel work parameter is passed from the parallelism monitor module 120 to the multiprocessor decision algorithm module 125.

The multiprocessor decision algorithm module 125 may comprise software or hardware or both. According to one exemplary embodiment, the multiprocessor decision algorithm module 125 may comprise software. The multiprocessor decision algorithm module 125 determines how many cores 222, 224, 226 should be powered or "active" based on the running percentage of work that it receives from the parallelism monitor module 120.

The multiprocessor decision algorithm module 125 may make its decisions on which cores 222, 224, 226 should be powered by using various parameters that include threshold values. These parameters may be derived based on the power consumption characteristics for a particular portable computing device 100 in the overhead involved in powering on/off the cores 222, 224, 226. Exemplary parameters include, but are not limited to: a wake-up percentage ("Pw") of parallel work which is a threshold for the percentage of work executed in parallel for activating on or more cores 222, 224, 226; wake-up time duration ("Tw") which is the threshold for the amount of time for which the Pw threshold has been achieved or exceeded for a certain number of samples taken during duration Tw before one or more additional cores 222, 224, 226 are powered on; a sleep percentage ("Ps") which is the threshold for percentage of work executed in parallel that has been achieved or existing below this threshold for deactivating one or more cores 222, 224, 226; and sleep time duration ("Ts") which is the threshold for the amount of time for which the Ps threshold is maintained or fallen below this threshold for a certain number of samples taken during duration Ts before one or more cores 222, 224, 226 are powered off.

Exemplary relationships among the parameters which form the decisions made by the multiprocessor decision algorithm module 125 include: if the current running percentage of parallel work detected by the parallelism monitor module 120 is greater than the Pw threshold and if this running percentage has been detected for a duration greater than the Tw threshold, then the multiprocessor decision algorithm module 125 may issue a command to the power controller 130 to turn on one or more additional cores 222, 224, 226 to manage the current parallel workload. In a situation in which parallel cores 222, 224, 226 are processing work tasks simultaneously and if the current running percentage of parallel work detected by the parallelism monitor module 120 is less than or equal to the Ps parameter and if this running percentage has been detected for duration greater than or equal to the Ts threshold, then the multiprocessor decision algorithm module 125 may issue a command to the power controller 130 to turn off one or more cores 222, 224, 226.

As described above, the CPU power controller 130 receives messages from the multiprocessor decision algorithm module 125 for powering on and for powering off one or more cores 222, 224, 226 or other CPUs 110. The CPU power controller 130 is usually embodied in hardware for controlling power to the one or more cores 222, 224, 226 or other CPUs 110. When the CPU power controller 130 turns "off" a core 222, 224, or 226 or another CPU 110, this "off" state may comprise a low-power state as understood by one of ordinary skill in the art. In other instances, the "off" state may also comprise the complete absence of power.

Figure 3A:
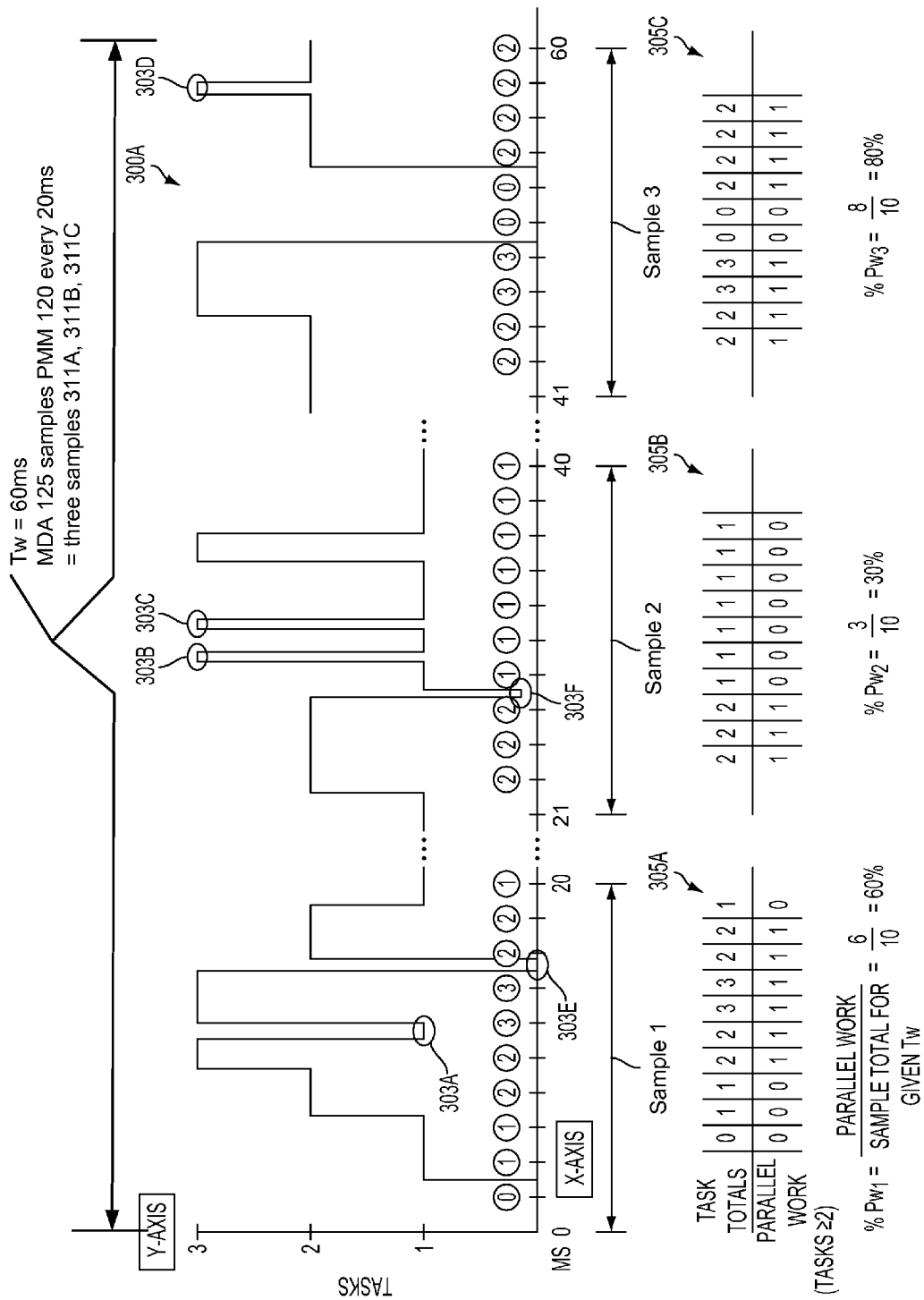
FIG. 3A is a graph of work tasks assigned to CPUs and or cores of a multicore CPU plotted over time for a first workload scenario.

FIG. 3A is a graph 300A of work tasks assigned to CPUs 110 and or cores 222, 224, or 226 of a multicore CPU 110 plotted over time for a first workload scenario. The data plotted graph 300A includes the work tasks from application modules 119 managed by the O/S scheduler 105 and assigned to the run queues 115. The number of work tasks are plotted on the Y-axis while time denoted in milliseconds is plotted along the X-axis. This data in FIG. 3A includes three percentage sample periods 311A, 311B, 311C each having a length of twenty milliseconds taken during wake up duration "Tw" having a length of sixty milliseconds. The frequency at which the total number of work tasks over a particular percentage sample period 311 is monitored may comprise about two milliseconds such that ten work readings may be taken over a given percentage sample period 311 of about twenty milliseconds.

The length of the Tw wake-up duration, the size of each percentage sample period 311, the frequency at which samples are taken during the percentage sample periods 311, may be varied and are within the scope of this disclosure as understood by one of ordinary skill in the art.

The percentage of parallel work (Pw or Ps) for a given percentage sample period is governed by the following equation:

$$P\% = \text{Instances of Parallel Work}/\text{number of samples for a given sample period} \qquad \text{EQ1:}$$

Parallel work is defined as the threshold in which the number of work tasks allows for the use of two or more cores 222, 224, 226 or two or more CPUs 110. This means that usually whenever the number of work tasks is greater than one, then parallel work is present in which two or more cores 222, 224, 226 of a multicore CPU 110 or two or more CPUs 110 may be activated to support the current number of parallel work tasks.

For example, in the exemplary work scenario illustrated in FIG. 3A, the first data point in the first percentage sample period 311A reflects zero work tasks which also equates into zero parallel work. See first table 305A, first column. The second data point in the first percentage sample period 311 reflects a value of one work task which is less than the threshold of two work tasks for indicating the presence of parallel work. Therefore, a zero value or the absence of parallel work exists for the second data point of the first percentage sample period 311A in the second column of the first table 305A. The same holds true for the third data point for the first percentage sample period 311A which has one work task and a corresponding value of zero parallel work as reflected by the third column of the first table 305A.

However, the fourth and fifth data points for first percentage sample period 311 reflect at least two work tasks for each data point which translates into the presence of parallel work. See first table 305A, fourth and fifth columns.

The percentage of parallel work for the first percentage sample period 311A (for waking up cores 222, 224, 226 or additional CPUs 110) is 60% which is based on six counts of parallel work over a total of 10 samples taken during the first percentage sample period 311A. Similarly, the percentage of parallel work for the second percentage sample period 311B is 30% while the percentage of parallel work for the third percentage sample period 311C is 80% as reflected by the second and third tables 305B, 305C respectively.

The importance of selecting an appropriate magnitude for the frequency in which each percentage sampling period 311 occurs within the wake-up duration Tw, the frequency and number of the data points taken during a particular percentage sampling period 311, and the length of the sampling duration Tw are apparent to one of ordinary skill in the art based on the several data points reflected in the first graph 300A.

For example, a first region 303A of the first graph 300A reflects a drop in work tasks between the fifth and sixth data points of the first percentage sample period 311A. Since the frequency of the data points taken during the first percentage sampling period 311 is set for about two milliseconds in this example, this drop in work tasks between the fifth and sixth data points at first region 303A went undetected. This drop in work tasks which went undetected is not that significant since the percentage sample period 311A was appropriately sized to capture the bulk of the work activity being managed by the system 101. Even if this drop in work occurring in region 303A of the first graph 300A was detected during the first percentage sample period 311, then its impact would have been minimal to the percentage of parallel work calculated since the length of the first percentage sample period 311A captured the majority of work being processed over the first percentage sample period 311A.

As noted previously, the percentage of parallel work parameters (Pw and Ps) are calculated by the parallelism monitor module 120 and transmitted to the multiprocessor decision algorithm module 125. The multiprocessor decision algorithm 125 may have thresholds that may be set for the percentage of parallel work parameters (Ps) for turning "off" and (Pw) for turning "on" one or more additional cores 222, 224, and 226 of a multicore CPU 110 or additional CPUs 110. The thresholds for the percentage of parallel work parameters (Pw and Ps) may be empirically determined and updated such that about five percent or less in difference of performance is achieved when multicores and/or additional CPUs 110 are activated for parallel work, as understood by one of ordinary skill in the art.

For example, the threshold for the wake-up parallel work percentage parameter Pw may be determined by using this standard five percent performance measure. For example, suppose a set number of work tasks usually takes approximately one hundred milliseconds to be completed by a single processor 110. Then, the Pw parameter for turning "on" one or more additional cores 222, 224, and 226 or additional CPUs 110 should be calculated so that a maximum of 105 milliseconds is not exceeded when the work is divided among two or more cores 222, 224, 226 of a multicore CPU 110 or among two or more CPUs 110. One of ordinary skill in the art recognizes that five milliseconds is approximately 5% of one hundred milliseconds.

As another example, as noted previously, the threshold for the wake-up parallel work percentage parameter Pw is usually set or established off-line prior to operation of the PCD 100. If the threshold for the wake-up parallel work percentage parameter Pw is set equal to approximately fifty-five (55%) percent, then this would mean that the parallelism monitor module 120 would need to detect this amount or greater of parallel work for a certain consecutive number of percentage samples taken during a wake-up Tw duration.

In the exemplary scenarios illustrated in FIG. 3A, the wake-up duration Tw is set for sixty milliseconds while the number of percentage samples is set to occur every twenty milliseconds. This means that the fifty-five percent value for Pw must be met by at least three consecutive samples for each wake-up duration of sixty milliseconds.

In the exemplary embodiment of FIG. 3A, only the first percentage sample 311A and third percentage sample 311C exceed the wake-up parallel work percentage Pw value of fifty-five percent. The second percentage sample is thirty percent which is lower than the threshold value Pw of fifty-five percent. Since Pw was not achieved over the three consecutive percentage samples of 311A, 311B, and 311C, then the multiprocessor decision algorithm module 125 would not issue any commands to the CPU power controller 130.

However, if the Pw threshold was set for fifty five percent and the percentage sample length was set equal to the wake-up duration Tw such that percentages of parallel work were only taken every sixty milliseconds (meaning that only one sample is taken for each duration Tw), then the Pw threshold would be met. The Pw threshold would be met in such a scenario since the single percentage of parallel work value for the sixty millisecond window would be equal to about 56.6% (seventeen parallel work instances divided/over thirty readings). The multiprocessor decision algorithm module 125 in this scenario would issue messages containing commands for the CPU power controller 130 to turn "ON" one or more additional cores 222, 224, or 226 of a multicore CPU 110 or additional CPUs 110 (not illustrated).

Figure 3B:
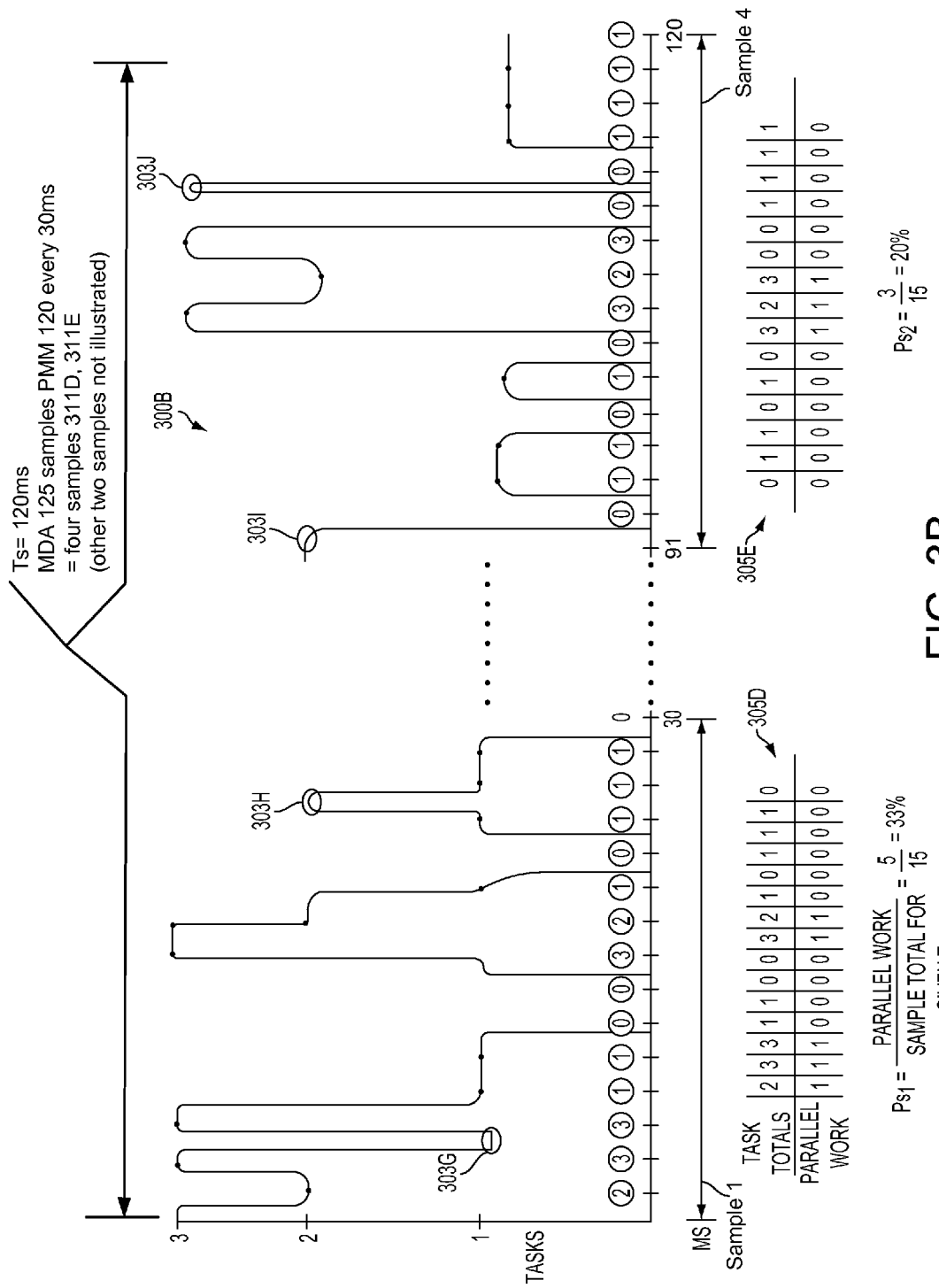
FIG. 3B is a graph of work tasks assigned to CPUs and/or cores of a multicore CPU plotted over time for a second workload scenario.

FIG. 3B is a graph 300B of work tasks assigned to CPUs 110 and/or cores 222, 224, or 226 of a multicore CPU 110 plotted over time for a second workload scenario. FIG. 3B is very similar to FIG. 3A, therefore, only the differences between these two figures will be described below.

According to the exemplary second workload scenario illustrated by graph 300B, the percentage sample period 311 is set to a length of approximately thirty milliseconds with readings of work volume taken approximately every two milliseconds. The length of the sleep duration Ts for turning "off" on or more CPUs 110 and/or cores 222, 224, or 226 may be set for one-hundred twenty milliseconds. This means that the multiprocessor decision algorithm module 125 in this scenario would issue messages containing commands for the CPU power controller 130 to turn "Off" one or more cores 222, 224, or 226 of a multicore CPU 110 or additional CPUs 110 (not illustrated) if the sleep work percentage Pw was achieved for at least four consecutive percentage sample periods 311.

Relative to the processor "wake-up" percentage sample periods 311A-C of the first graph 300A, the processor "sleep" percentage sample periods 311D-E of the second graph 300B are approximately ten milliseconds longer. The processor "sleep" percentage sample periods 311D-E will generally be longer than the "wake-up" percentage sample periods 311A-C when a conservative approach for shutting off one or more cores 222, 224, 226 or additional CPUs 110 is taken. One of ordinary skill the art recognizes that usually it is better to keep additional cores 222, 224, 226 or additional CPUs 110 powered "on" over longer periods of time compared to shutting "off" cores 222, 224, 226 or additional CPUs 110 in a shorter period of time and then restarting the same cores 222, 224, 226 or CPUs 110 to match current demand with respect to work tasks being processed. One of ordinary skill in the art recognizes that more power may be consumed when a plurality of devices are turned on and off more frequently compared to leaving the plurality of devices powered on for longer durations and then shutting them down for longer durations.

As another example, as noted previously, the threshold for the sleep parallel work percentage parameter Ps is usually set or established off-line prior to operation of the PCD 100. If the threshold for the sleep parallel work percentage parameter Ps is set equal to approximately thirty-five percent, then this would mean that the parallelism monitor module 120 would need to detect this amount or less of parallel work for a given sample duration Ts for a certain number of percentage sample periods. The number of percentage sample periods is based on their size.

Therefore, if the length of the sleep duration Ts for turning "off" one or more CPUs 110 and/or cores 222, 224, or 226 is set for one-hundred twenty milliseconds with a sample percentage size of thirty milliseconds, then the threshold of Ps would need to be met for at least four consecutive samples (4×30=120). If the sample percentage size was set for twenty milliseconds, then the threshold of Ps would need to be met for at least six consecutive samples (6×20=120).

In the exemplary scenarios illustrated in FIG. 3B, the thirty-five percent threshold for the Ps parameter is met by the first and fourth percentage sample periods 311D, 311E. The second and third percentage sample periods are not illustrated in FIG. 3B. For the first percentage sample period 311D, the parallel work percentage (Ps) has a value of approximately 33%. For the fourth percentage sample period 311E, the parallel work percentage (Ps) has a value of approximately 20%.

If it is assumed that the second and third percentage periods 311 (not illustrated in FIG. 3B) have parallel work percentage values (Ps) of less than or equal to the thirty-five percent threshold value (Ps), then the multiprocessor decision algorithm module 125 after the fourth percentage period 311E would issue messages containing commands for the CPU power controller 130 to turn "OFF" (or put into sleep mode) one or more additional cores 222, 224, or 226 of a multicore CPU 110 or additional CPUs 110 (not illustrated).

As will be outlined in the flow charts described below, the multiprocessor decision algorithm module 125 uses either the sleep parallel work percentage parameter Ps or the wake-up parallel work percentage parameter Pw depending upon its current operating mode. The multiprocessor decision algorithm module 125 may have at least two different operating modes: a multicore/CPU mode or a singlecore/CPU mode. The wake-up parallel work percentage parameter Pw is used by the multiprocessor decision algorithm module 125 when it is in its singlecore/CPU mode. The sleep parallel work percentage parameter Ps is used by the multiprocessor decision algorithm module 125 when it is in its multicore/CPU mode.

Figure 4:
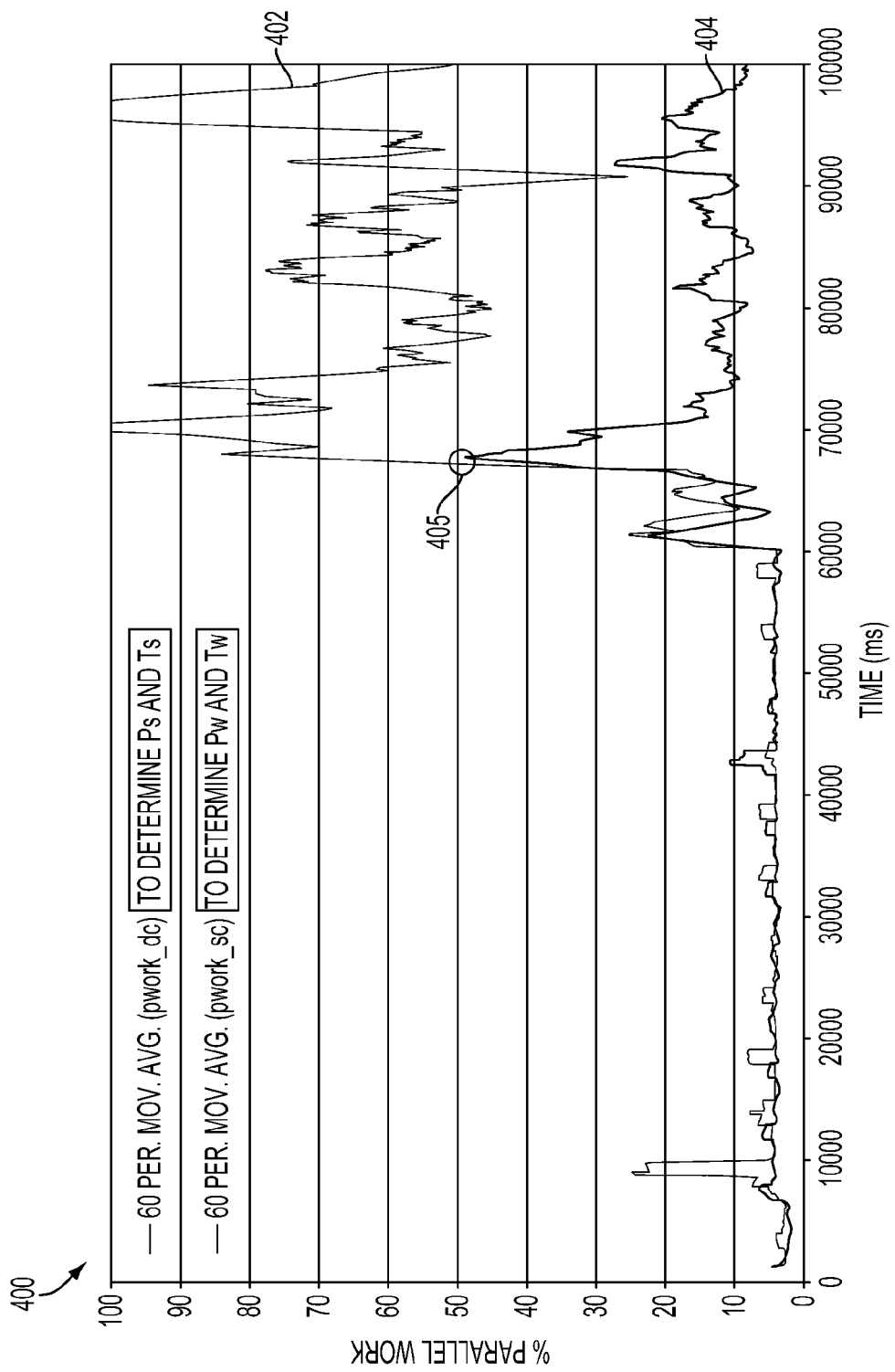
FIG. 4 is a graph of a percentage of parallel work for an exemplary workload plotted over time.

FIG. 4 is a graph 400 of a percentage of parallel work for an exemplary workload plotted over time. According to an exemplary embodiment, the workload comprises frames of video displayed during playback of a movie with a system 101 comprising at least two cores 222, 224 of a multicore CPU 110 of a PCD 100.

The first line 402 represents a percentage of parallel work monitored from a single core. The second line 404 represents a percentage of parallel work monitored across two cores of a multicore system 101.

According to this exemplary embodiment, the wake-up parallel work percentage parameter Pw is set equal to approximately fifty percent. Therefore, up until point 405 on the graph 400, the dual-core system 101 supporting the video playback workload operates in a single core mode. At point 405 which represents a work percentage parameter of approximately fifty percent, the dual-core system 101 enters into a parallel work mode (a "dual-core mode") compared to its prior single-core mode.

According to this exemplary environment, the multiprocessor decision algorithm module 125 monitors the first line 402 up until point 405 using the wake-up parallel work percentage parameter Pw, which is set equal to approximately fifty percent in this example. From point 405 and thereafter, the multiprocessor decision algorithm module 125 monitors the second line 404 using the sleep parallel work percentage parameter Ps. The sleep parallel work percentage parameter Ps may be set to any value as understood by one of ordinary skill in the art.

Figure 5:
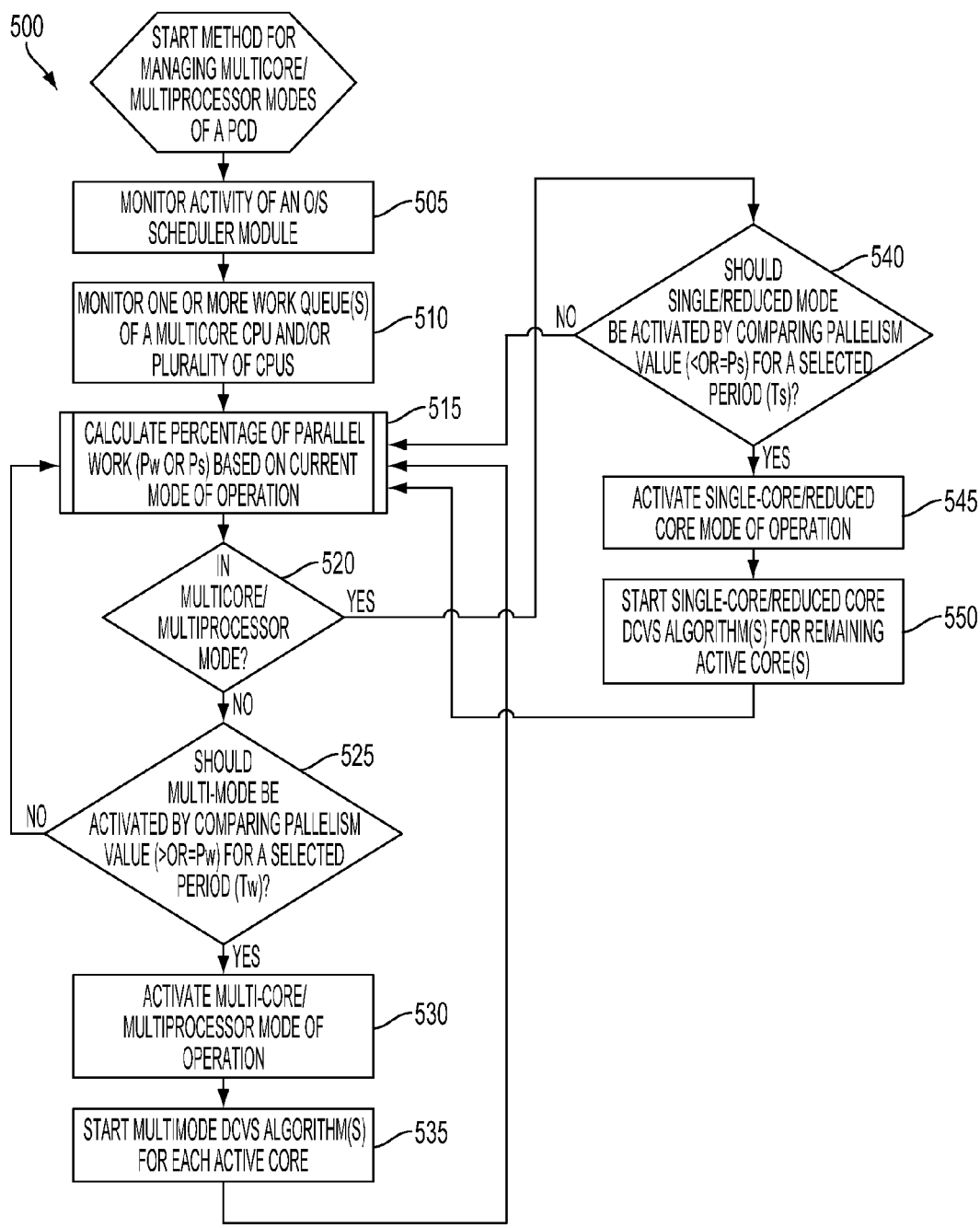
FIG. 5 is a logical flowchart illustrating an exemplary method for dynamically controlling multiple CPUs and/or multicore CPUs.

FIG. 5 is a logical flowchart illustrating an exemplary method 500 for dynamically controlling multiple CPUs and/or multicore CPUs 110 of a portable computing device 100. Block 505 comprises a first step of the method 500. In block 505, data from an O/S scheduler module 505 may be received by a parallelism monitor module 120. As noted above, the parallelism monitor module 120 may receive callbacks from the O/S scheduler 105 when work tasks are being added to or removed from the system 101.

Next, in block 505, the work queues 115 of the system 101 may be monitored with the parallelism monitor module 120. The parallelism monitor module 120 may poll the run queues 115 at certain predetermined time periods such as on the order of every two milliseconds as illustrated in FIG. 3A. If the parallelism monitor module 120 receives any callbacks as detected in block 505, then this activity may cause the parallelism monitor module 120 to immediately poll the run queue 115 of its current workload. Alternatively, a different call may be received for each action, such as when a task is added or if a task is removed from run queues 115. The parallelism monitor module 120 may keep a local count of the tasks present in the run queues 115.

Next, in routine or sub-method 515, the parallelism monitor module 120 may calculate a percentage of parallel work. As described previously, the percentage of parallel work that is calculated (Ps or Pw) at this stage or block 515 is dependent upon a current mode of operation for the system 101 (whether to use duration Ts or duration Tw). In a multicore/CPU mode of operation, the parallelism monitor module 120 utilizes the wake-up parallel work percentage parameter Pw having a corresponding duration of Tw when it is in its singlecore/CPU mode. The sleep parallel work percentage parameter Ps having a corresponding duration of Ts is used by the parallelism monitor module 120 when the system 101 is in its multicore/CPU mode, as described above.

For example, if the system 101 is in a singlecore (not in a multicore or not in a multiprocessor) mode of operation, then the multiprocessor decision algorithm module 125 will monitor the parameters associated with the wake-up parallel work percentage Pw using a corresponding duration Tw. FIG. 3A and tables 305A-C illustrate how the wake-up parallel work percentages Pw would be calculated according to one exemplary embodiment. Meanwhile, if the system 101 is in a multicore/multiprocessor mode of operation, then the multiprocessor decision algorithm module 125 would monitor the parameters associated with the sleep parallel work percentage Ps which uses the duration Ts, as illustrated in FIG. 3B and calculated in tables 305D-E. In some exemplary embodiments, durations Tw and Ts may be equal as well as their respective number of percentage samples 311.

Next, in decision block 520, the multiprocessor decision algorithm module 125 determines if the system 101 is operating in a multicore/CPU mode or not. If the inquiry to decision block 520 is negative, then the "NO" branch is followed to decision block 525. If the inquiry to decision block 520 is positive, then the "YES" branch is followed to block 540.

In decision block 525, the multiprocessor decision algorithm module 125 determines if the current single core/single processor mode should be changed to a multicore/multiprocessor mode by comparing the current value of percentage of parallel work with the threshold value set for the wake-up parallel work percentage parameter Pw having a corresponding duration Tw and a set percentage sample period size. If the inquiry to decision block 525 is negative (meaning that the Pw threshold was not met by the consecutive number of percentage sample periods for the duration Tw), then the "NO" branch is followed back to routine or submethod 515. If the inquiry to decision block 520 is positive (meaning that the Pw threshold was met or achieved by the consecutive number of percentage sample periods for the duration Tw), then the "YES" branch is followed to block 530.

In block 530, the multiprocessor decision algorithm module 125 issues commands to the CPU power controller 130 to turn "ON" one or more cores 222, 224, 226 or processors 110 such that the system 101 is in a multicore/processor state. For example, block 530 would be executed if the parallel work state as illustrated by the first through third wake-up percentage of parallel work periods 311A-311C of FIG. 3A was detected (assuming Tw was set equal to sixty milliseconds and each percentage period 311A-C is set equal to twenty milliseconds) and if the Pw threshold was set for 30% or above Next, in block 535, the multiprocessor decision algorithm module 125 may also issue commands through the CPU power controller 130 or directly to each core 222, 224, 226/processor 110 to initialize respective dynamic voltage and frequency scaling ("DVFS") algorithms that are specific the multicore/multiprocessor mode. Further details about the DVFS algorithms will be described below in connection with FIG. 7. The process or method 500 then continues back to routine or sub-method 515.

In decision block 540, the multiprocessor decision algorithm module 125 determines if the current multicore mode should be changed to a single core/reduced core mode by comparing the current value of percentage of parallel work with the threshold value set for the sleep parallel work percentage parameter Ps having a corresponding sampling duration Ts. If the inquiry to decision block 540 is negative, then the "NO" branch is followed back to routine or submethod 515. If the inquiry to decision block 540 is positive, then the "YES" branch is followed to block 545.

In block 545, the multiprocessor decision algorithm module 125 issues commands to the CPU power controller 130 to shift the system 101 from a multicore/multiprocessor state to a single core/reduced core processor state. The multiprocessor decision algorithm module 125 may issue commands to the CPU power controller 130 to turn "OFF" or power down one or more cores 222, 224, 226 or CPUs 110. As noted previously, this "OFF" state may comprise a "sleep" state or low power state instead of the complete absence of power. For example, block 545 would be executed if the parallel work state as illustrated by the first through fourth sleep percentage of parallel work periods 311D, 311E of FIG. 3B was detected (assuming Ts was set equal to duration of one-hundred twenty milliseconds and each percentage period 311D, E is set equal to thirty milliseconds) and if the Ps threshold was set for 33% or below.

Next, in block 550, the multiprocessor decision algorithm module 125 may issue commands to the remaining active single core 222, 224, or 226 or CPU 110 to adjust its DVFS algorithm for singe core/reduced processor operation. Further details about DVFS algorithms will be described below in connection with FIG. 7. The method 500 then returns back to routine or submethod 515.

Figure 6:
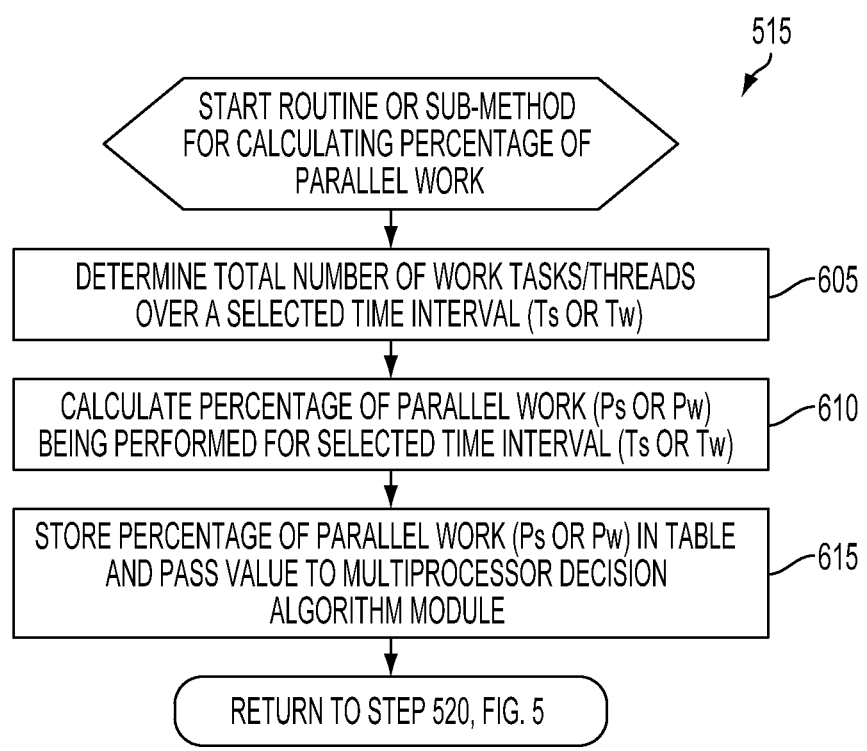
FIG. 6 is a logical flowchart illustrating an exemplary sub-method or routine for calculating a percentage of parallel work among multiple CPUs and/or cores of a multicore CPU.

FIG. 6 is a logical flowchart illustrating an exemplary sub-method or routine 515 for calculating a percentage of parallel work among multiple cores 222, 224, 226 and/or multiple CPUs 110. Block 605 is the first step of the sub-method or routine 515. In block 605, the total number of tasks and/or threads over a selected time interval is calculated by the parallelism monitor module 120. This total number is based on the current mode of operation for the system 101.

For this block 605, in a multicore/multiprocessor mode of operation for system 101, the parallelism monitor module 120 will use the duration Ts associated with the sleep parallel work percentage parameter Ps as illustrated in FIG. 3B and tables 305D-305E. And a single core/single processor mode of operation for system 101, the parallelism monitor module 120 use the duration Tw associated with the wake-up work percentage parameter Pw as illustrated in FIG. 3A and tables 305A-305C. Each duration Ts and Tw may have its percentage sampling periods customized based on the magnitude of the duration. For example, a duration Ts may have a magnitude of fifty milliseconds. This means that one exemplary percentage sampling period may comprise percentage readings taken every ten milliseconds which equates to five readings over the duration Ts. An exemplary percentage sampling period may comprise percentage readings taken ever five milliseconds which equates into ten readings over the duration Ts. And so on.

Next, in block 610 the percentage of parallel work may be calculated by the parallelism monitor module 120 based on the current mode of operation for the system 101. As described above in connection with block 605, the parallelism monitor module 120 may calculate either the wake-up percentage parameter Pw or the sleep percentage parameter Ps in this block depending upon the current mode of operation for the system 101 as illustrated in FIGS. 3A-3B. Next in block 615, the parallelism monitor module 120 may store the Pw or Ps parameter in a table and communicate this parameter to the multiprocessor decision algorithm module 125. The sub method or routine 515 then returns to decision block 520 of FIG. 5.

Figure 7:
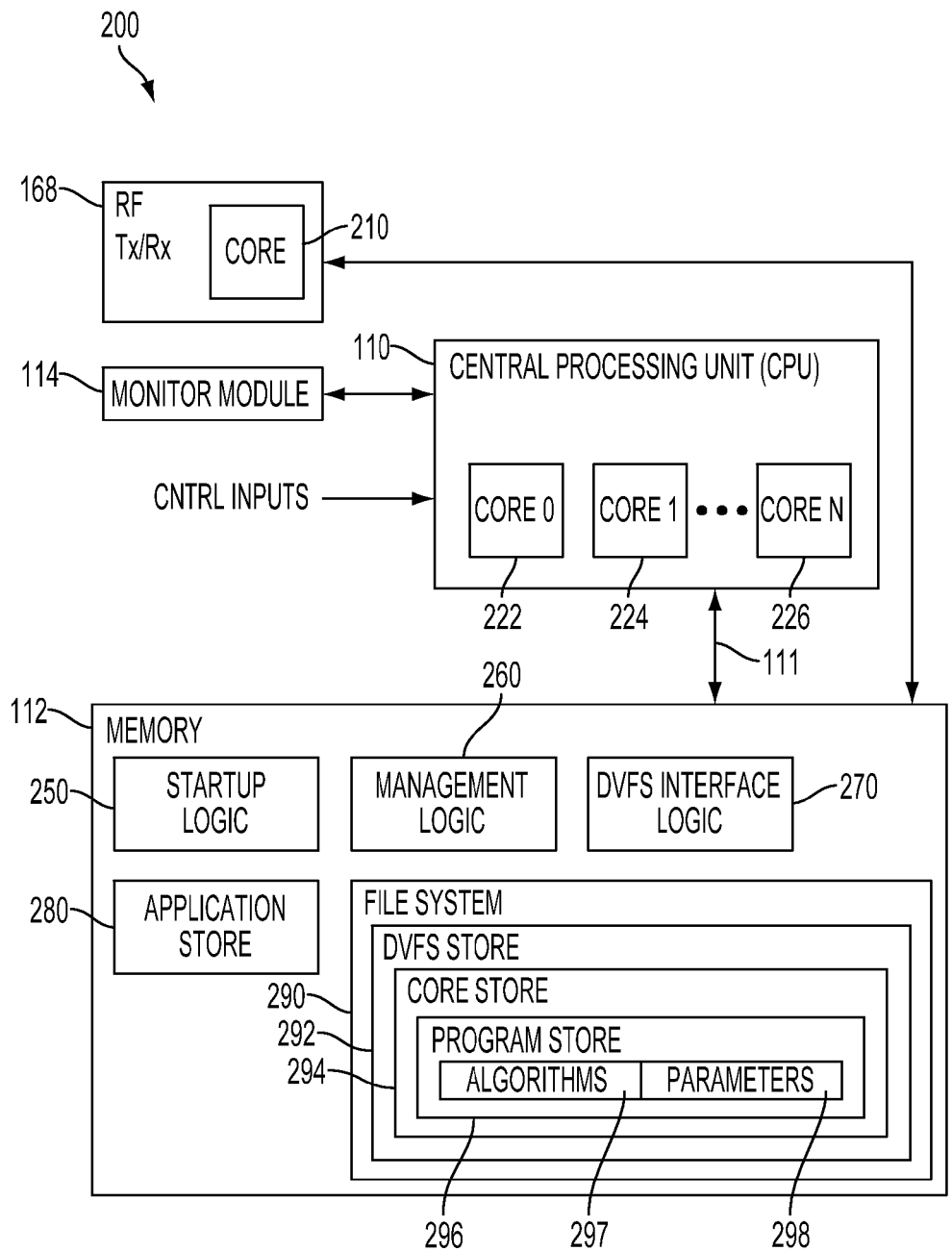
FIG. 7 is a schematic diagram illustrating features of the portable computing device of FIG. 1.

FIG. 7 is a schematic diagram illustrating features of the PCD 100 of FIG. 1 and particularly, the elements of PCD 100 that support dynamic voltage and frequency scaling ("DVFS") in processor designs. DVFS enables trade-offs between power consumption and performance. Processors 110 designed to take advantage of DVFS allow the clock frequency of the processor to be adjusted with a corresponding adjustment in voltage. Reducing clock frequency alone is not useful, since any power savings is offset by an increase in execution time, resulting in no net reduction in the total energy consumed. However, a reduction in operating voltage results in a proportional savings in power consumed.

As illustrated in FIG. 7, the central processing unit 110 is coupled to the memory 112 via a bus 211. The central processing unit 110 is a multiple-core processor having N core processors. That is, the central processing unit 110 includes a first core 222, a second core 224, and a $N^{th}$ core 226. As is known, each of the first core 222, the second core 224 and the $N^{th}$ core 226 are available for supporting a dedicated application or program 119. Alternatively, one or more applications or programs 119 may be distributed for processing across two or more of the available cores.

The first core 222, the second core 224 through to the $N^{th}$ core 226 can be integrated on a single integrated circuit die, or they may be integrated or coupled on separate dies in a multiple-circuit package. Designers may couple the first core 222, the second core 224 through to the $N^{th}$ core 226 via one or more shared caches and they may implement message or instruction passing via network topologies such as bus, ring, mesh and crossbar topologies.

In the illustrated embodiment, the RF transceiver 268 is implemented via digital circuit elements and includes at least one processor such as the core processor 210 (labeled "Core"). In this digital implementation, the RF transceiver 268 is coupled to the memory 112 via bus 213.

Each of the bus 211 and the bus 213 may include multiple communication paths via one or more wired or wireless connections, as is known in the art. The bus 211 and the bus 213 may have additional elements, which are omitted for simplicity, such as controllers, buffers (caches), drivers, repeaters, and receivers, to enable communications. Further, the bus 211 and the bus 213 may include address, control, and/or data connections to enable appropriate communications among the aforementioned components.

When the logic used by the PCD 100 is implemented in software, as is shown in FIG. 7, it should be noted that one or more of startup logic 250, management logic 260, DVFS interface logic 270, applications in application store 280 and portions of the file system 290 may be stored on any computer-readable medium for use by or in connection with any computer-related system or method.

In an alternative embodiment, where one or more of the startup logic 250, management logic 260 and perhaps the DVFS interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As noted above, the memory 112 may comprise a non-volatile data storage device such as a flash memory or a solid-state memory device. Although depicted as a single device, the memory 112 may be a distributed memory device with separate data stores coupled to the central processing unit and or the core 210 (or additional processor cores) in the RF transceiver 268.

The startup logic 250 includes one or more executable instructions for selectively identifying, loading, and executing a select program for managing or controlling the performance of one or more of the available cores such as the first core 222, the second core 224 through to the $N^{th}$ core 226. A select program can be found in the program store 296 of the embedded file system 290 and is defined by a specific combination of a performance scaling algorithm 297 and a set of parameters 298. The select program, when executed by one or more of the core processors 222, 224, and 226 in the central processing unit 110 and the core 210 in the RF transceiver 268, may operate in accordance with one or more signals provided by the performance monitor module 114 to scale the performance of the respective processor core. In this regard, the monitor module 114 may provide one or more indicators of events, processes, applications, resource status conditions, elapsed time, temperature, etc.

For example, the monitor module 114 may receive signals from the multiprocessor decision algorithm module 125 that the CPU 110 should now operate in a multicore/multiprocessor mode. Alternatively, the monitor module 114 may receive signals from the multiprocessor decision algorithm module 125 that the CPU 110 should now operate in an single core/reduce code mode.

The management logic 260 includes one or more executable instructions for terminating an operative performance scaling program on one or more of the respective processor cores 222, 224, 226, as well as selectively identifying, loading, and executing a more suitable replacement program for managing or controlling the performance of one or more of the available cores 222, 224, 226. The management logic 260 is arranged to perform these functions at run time or while the PCD 100 is powered and in use by an operator of the device. A replacement program can be found in the program store 296 of the embedded file system 290 and is defined by a specific combination of a performance scaling algorithm 297 and a set of parameters 298. As illustrated in FIG. 8, the program store 296 can be hierarchically arranged within a core store 294 and a DVFS store 292. The replacement program, when executed by one or more of the core processors 222, 224, 226 in the central processing unit 110 or the core 210 in the RF transceiver 268, may operate in accordance with one or more signals provided by the monitor module 114 or one or more signals provided on the respective control inputs of the various processor cores 222, 224, 226 to scale the performance of the respective processor core.

The DVFS interface logic or interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all performance scaling in the RF transceiver 268 when the received signal power falls below an identified threshold. By way of further example, the inputs may include a change to the management logic 260 that instructs the PCD 100 to apply a desired program when the CPU 110 is in a multicore/multiprocessor mode or when the CPU 110 is in a single core/reduced processor mode, as governed by the method 500 described above in connection with FIG. 5.

As another example, the DVFS algorithms 297 may be tuned such that about five percent or less in difference of performance is achieved when multiple cores 222, 224, 226 and/or additional CPUs 110 are activated for specified parallel work, as understood by one of ordinary skill in the art. The algorithms 297 may be adjusted in unison with the thresholds for the percentage of parallel work parameters (Pw and Ps) to achieve the goal of about five percent or less in difference of performance.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

FIGS. 8A and 8B include schematic diagrams illustrating embodiments of use cases in which parallel work may be generated and supported by the system 101 of FIG. 2. A first example use case is illustrated in the table 800 of FIG. 8A. The use case includes a set of tasks that are capable of being performed on the PCD 100. The tasks include web browsing (i.e., executing a browser application while the PCD 100 is in communication range of transmitter that is coupled to the Internet), audio/video playback, audio playback, running an email application, and running one or more other applications. The parameters 298 (P) and which are associated with the DVFS algorithms 297 are listed in table 810. Column A of table 810 may list the operating parameters P1 and P2 associated with a first and second core 222, 224 of a first use case "A." This first use case "A" may correspond to a single core/reduced processor mode of operation compared to the second use case "B" described below. The rows of table 810 generally correspond to the rows of table 800.

Column B of table 810 may list operating parameters P1, P2, and P5 for first, second, and fifth cores (such as 222, 224, and a fifth core not illustrated) of a second use case "B." This second use case "B" may correspond to a multicore/multiprocessor operation as described above relative to the first use case "A" of table 810.

A second example use case is illustrated in the table 850 of FIG. 8B. This second use case includes a short messaging service (SMS) application in place of the email application of the first use case. The parameters 298 (also denoted as P) and which are associated with the DVFS algorithms are listed in table 860. The rows of table 860 generally correspond to the rows of table 850.

Column A of table 810 may list the operating parameters P1 and P4 associated with a first and fourth core (such as 222 and a fourth core not illustrated) of a first use case "A." This first use case "A" may correspond to a single core/reduced processor mode of operation compared to the second use case "B" of Table 860 as described below.

Column B of table 860 may list operating parameters P1, P3, and P4 for first, third, and fourth cores (such as 222, a third and a fourth core not illustrated) of a second use case "B." This second use case "B" may correspond to a multicore/multiprocessor operation as described above relative to the first use case "A" of table 860.

It is possible that one or more use cases may present an identifiable parallel workload on the processing resources of the PCD 100. If the parallel workload on the PCD 100 can be identified by the parallelism monitor module 120, the multiprocessor decision algorithm module 125 may issue commands to the monitor module 114 and the CPU power controller 130 to adjust operating conditions on the PCD 100 as may be desired to ensure performance, conserve battery power, or apply specific performance scaling algorithms 297 and corresponding parameters 298 designed to achieve a desired tradeoff between performance and power consumption.

The multiprocessor decision algorithm module 125 operates in real time to identify a present parallel work load on the PCD 100 and under certain circumstances, such as reaching threshold values of Pw or PS, reacts to an identified parallel workload by adjusting one or more operating parameters on the PCD 100, such as either powering "ON" additional cores 222, 224, 226 or powering "OFF" such cores as described above in Blocks 525 and 540 in connection with FIG. 5. For PCDs 100 that include multiple performance scaling algorithms 297 that are known to achieve a desired balance between operator experience and power consumption, the identification of an identified parallel workload may be used by the multiprocessor decision algorithm module 125 to select and apply an appropriate combination of a select performance scaling algorithm 297 and one or more parameters 298 on the PCD 100, such as in Blocks 535 and 550 of method 500 illustrated in FIG. 5.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for dynamically determining the degree of workload parallelism and automatically adjusting the number of cores supporting a workload in a portable computing device, the method comprising:
    monitoring one or more work queues of a multicore processor, wherein monitoring comprises sampling a current number of tasks assigned to the multicore processor;
    calculating a percentage of parallel work based on a current mode of operation of the multicore processor and the monitoring of the one or more work queues, wherein the percentage of parallel work (P) is calculated using the equation P=instances of parallel work over a sampling period/number of samples taken over the sampling period, wherein an instance of parallel work occurs when the current number of tasks assigned to the multicore processor allows for using two or more cores of the multicore processor;
    determining whether the current mode of operation for the multicore processor should be changed based on the calculated percentage of parallel work; and
    instructing one or more cores of the multicore processor to switch a dynamic voltage and frequency scaling algorithm in response to determining that the current mode of operation for the multicore processor should be changed.

2. The method of claim 1, further comprising determining whether the calculated percentage of parallel work has been achieved by measuring parallel work over a plurality of consecutive samples.

3. The method of claim 1, wherein determining whether the current mode of operation for the multicore processor should be changed based on the calculated percentage of parallel work comprises determining whether the percentage of parallel work has exceeded a threshold value established for entering into a multicore state.

4. The method of claim 3, wherein the threshold value is a first threshold value, wherein determining whether the current mode of operation for the multicore processor should be changed based on the calculated percentage of parallel work further comprises determining whether the percentage of parallel work has fallen below a second threshold value established for entering into a single processor state.

5. The method of claim 1, further comprising issuing one or more commands to a central processing unit power controller in response to determining that the current mode of operation for the multicore processor should be changed based on the calculated percentage of parallel work.

6. The method of claim 5, wherein the one or more commands comprise instructions to place one or more cores into a sleep state.

7. The method of claim 5, wherein the one or more commands comprise instructions to place one or more cores into an active state.

8. The method of claim 1, wherein the portable computing device comprises at least one of a mobile phone, a pager, a personal digital assistant ("PDA"), a smartphone, a navigation device, a smartbook, and a media player.

9. A computer system for dynamically determining the degree of workload parallelism and automatically adjusting the number of cores supporting a workload in a portable computing device, the system comprising:
 a processor configured to perform operations comprising:
  monitoring one or more work queues of a multicore processor, wherein monitoring comprises sampling a current number of tasks assigned to the multicore processor;
  calculating a percentage of parallel work based on a current mode of operation of the multicore processor and the monitoring of the one or more work queues, wherein the percentage of parallel work (P) is calculated using the equation P=instances of parallel work over a sampling period/number of samples taken over the sampling period, wherein an instance of parallel work occurs when the current number of tasks assigned to the multicore processor allows for using two or more cores of the multicore processor;
  determining whether the current mode of operation for the multicore processor should be changed based on the calculated percentage of parallel work; and
  instructing one or more cores of the multicore processor to switch a dynamic voltage and frequency scaling algorithm in response to determining that the current mode of operation for the multicore processor should be changed.

10. The system of claim 9, wherein the processor is configured to perform operations further comprising determining whether the calculated percentage of parallel work has been achieved by measuring parallel work over a plurality of consecutive samples.

11. The system of claim 9, wherein the processor is configured to perform operations such that determining whether the current mode of operation for the multicore processor should be changed based on the calculated percentage of parallel work comprises determining whether the percentage of parallel work has exceeded a threshold value established for entering into a multicore state.

12. The system of claim 11, wherein the threshold value is a first threshold value, wherein the processor is configured to perform operations such that determining whether the current mode of operation for the multicore processor should be changed based on the calculated percentage of parallel work further comprises determining whether the percentage of parallel work has fallen below a second threshold value established for entering into a single processor state.

13. The system of claim 9, wherein the processor is configured to perform operations further comprising issuing one or more commands to a central processing unit power controller in response to determining that the current mode of operation for the multicore processor should be changed based on the calculated percentage of parallel work.

14. The system of claim 13, wherein the one or more commands comprise instructions to place one or more cores into a sleep state.

15. The system of claim 13, wherein the one or more commands comprise instructions to place one or more cores into an active state.

16. The system of claim 9, wherein the portable computing device comprises at least one of a mobile telephone, a personal digital assistant, a pager, a smartphone, a navigation device, and a hand-held computer with a wireless connection or link.

17. A computer system for managing one or more memory resources of a wireless handheld computing device, the system comprising:
 means for monitoring one or more work queues of a multicore processor comprising means for sampling a current number of tasks assigned to the multicore processor;
 means for calculating a percentage of parallel work based on a current mode of operation of the multicore processor and the monitoring of the one or more work queues, wherein the percentage of parallel work (P) is calculated using the equation P=instances of parallel work over a sampling period/number of samples taken over the sampling period, wherein an instance of parallel work occurs when the current number of tasks assigned to the multicore processor allows for using two or more cores of the multicore processor;
 means for determining whether the current mode of operation for the multicore processor should be changed based on the calculated percentage of parallel work; and
 means for instructing one or more cores of the multicore processor to switch a dynamic voltage and frequency scaling algorithm in response to determining that the current mode of operation for the multicore processor should be changed.

18. The system of claim 17, further comprising means for determining whether the calculated percentage of parallel work has been achieved by measuring parallel work over a plurality of consecutive samples.

19. The system of claim 17, wherein means for determining whether the current mode of operation for the multicore processor should be changed based on the calculated percentage of parallel work comprises means for determining whether the percentage of parallel work has exceeded a threshold value established for entering into a multicore state.

20. The system of claim 19, wherein the threshold value is a first threshold value, wherein means for determining whether the current mode of operation for the multicore processor should be changed based on the calculated percentage of parallel work further comprises means for determining whether the percentage of parallel work has fallen below a second threshold value established for entering into a single processor state.

21. The system of claim 17, further comprising means for issuing one or more commands to a central processing unit power controller in response to determining that the current mode of operation for the multicore processor should be changed based on the calculated percentage of parallel work.

22. The system of claim 21, wherein the one or more commands comprise instructions to place one or more cores into a sleep state.

23. The system of claim 21, wherein the one or more commands comprise instructions to place one or more cores into an active state.

24. The system of claim 17, wherein the portable computing device comprises at least one of a mobile telephone, a personal digital assistant, a pager, a smartphone, a navigation device, and a hand-held computer with a wireless connection or link.

25. A non-transitory processor-readable storage medium having stored thereon processor-executable instructions configured to cause a processor of a portable computing device to perform operations comprising:
- monitoring one or more work queues of a multicore processor, wherein monitoring comprises sampling a current number of tasks assigned to the multicore processor;
- calculating a percentage of parallel work based on a current mode of operation of the multicore processor and the monitoring of the one or more work queues, wherein the percentage of parallel work (P) is governed by the equation P=instances of parallel work over a sampling period/number of samples taken over the sampling period, wherein an instance of parallel work occurs when the current number of tasks assigned to the multicore processor allows for using two or more cores of the multicore processor;
- determining whether the current mode of operation for the multicore processor should be changed based on the calculated percentage of parallel work; and
- instructing one or more cores of the multicore processor to switch a dynamic voltage and frequency scaling algorithm in response to determining that the current mode of operation for the multicore processor should be changed.

26. The non-transitory processor-readable storage medium of claim 25, wherein the stored processor-executable instructions are configured to cause the processor of the portable computing device to perform operations further comprising:
- determining whether the calculated percentage of parallel work has been achieved by measuring parallel work over a plurality of consecutive samples.

27. The non-transitory processor-readable storage medium of claim 25, wherein the stored processor-executable instructions are configured to cause the processor of the portable computing device to perform operations such that:
- determining whether the current mode of operation for the multicore processor should be changed based on the calculated percentage of parallel work comprises determining whether the percentage of parallel work has exceeded a threshold value established for entering into a multicore state.

28. The non-transitory processor-readable storage medium of claim 25, wherein the threshold value is a first threshold value, and wherein the stored processor-executable instructions are configured to cause the processor of the portable computing device to perform operations such that determining whether the current mode of operation for the multicore processor should be changed based on the calculated percentage of parallel work further comprises determining whether the percentage of parallel work has fallen below a second threshold value established for entering into a single processor state.

29. The non-transitory processor-readable storage medium of claim 25, wherein the stored processor-executable instructions are configured to cause the processor of the portable computing device to perform operations further comprising issuing one or more commands to a central processing unit power controller in response to determining that the current mode of operation for the multicore processor should be changed based on the calculated percentage of parallel work.

30. The non-transitory processor-readable storage medium of claim 29, wherein the stored processor-executable instructions are configured to cause the processor of the portable computing device to perform operations such that the one or more commands comprise instructions to place one or more cores into a sleep state.

31. The non-transitory processor-readable storage medium of claim 29, wherein the stored processor-executable instructions are configured to cause the processor of the portable computing device to perform operations such that the one or more commands comprise instructions to place one or more cores into an active state.

32. The non-transitory processor-readable storage medium of claim 25, wherein the portable computing device comprises at least one of a mobile telephone, a personal digital assistant, a pager, a smartphone, a navigation device, and a hand-held computer with a wireless connection or link.

* * * * *